(12) United States Patent
Ansari

(10) Patent No.: US 8,997,154 B2
(45) Date of Patent: Mar. 31, 2015

(54) APPARATUS AND METHOD FOR OBTAINING MEDIA CONTENT

(75) Inventor: Ahmad Ansari, Cedar Park, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1506 days.

(21) Appl. No.: 12/234,240

(22) Filed: Sep. 19, 2008

(65) Prior Publication Data

US 2010/0077438 A1  Mar. 25, 2010

(51) Int. Cl.
| | | |
|---|---|---|
| G06F 3/00 | (2006.01) | |
| G06F 13/00 | (2006.01) | |
| H04N 5/445 | (2011.01) | |
| H04N 7/173 | (2011.01) | |
| H04N 21/2343 | (2011.01) | |
| H04N 21/258 | (2011.01) | |
| H04N 21/472 | (2011.01) | |
| H04N 21/6405 | (2011.01) | |
| H04N 21/6408 | (2011.01) | |
| H04N 21/643 | (2011.01) | |

(52) U.S. Cl.
CPC ... *H04N 7/17318* (2013.01); *H04N 21/234354* (2013.01); *H04N 21/25883* (2013.01); *H04N 21/25891* (2013.01); *H04N 21/47202* (2013.01); *H04N 21/6405* (2013.01); *H04N 21/6408* (2013.01); *H04N 21/64322* (2013.01)
USPC ............ 725/53; 725/44; 725/45; 725/46; 725/47; 725/48; 725/49; 725/50; 725/59; 707/706; 707/707; 707/722; 707/723; 707/731; 707/732; 707/733; 707/734

(58) Field of Classification Search
USPC ............ 725/44–50, 53, 59; 707/706–707, 707/722–723, 731–734
See application file for complete search history.

(56) References Cited

U.S. PATENT DOCUMENTS

| | | | | |
|---|---|---|---|---|
| 5,544,313 | A * | 8/1996 | Shachnai et al. | 725/92 |
| 5,956,716 | A * | 9/1999 | Kenner et al. | 1/1 |
| 6,438,579 | B1 * | 8/2002 | Hosken | 709/203 |
| 7,404,201 | B2 * | 7/2008 | Takeuchi et al. | 725/109 |
| 7,734,680 | B1 * | 6/2010 | Kurapati et al. | 709/203 |
| 7,793,326 | B2 * | 9/2010 | McCoskey et al. | 725/91 |
| 8,738,457 | B2 * | 5/2014 | Roever et al. | 705/26.1 |
| 2002/0042923 | A1 * | 4/2002 | Asmussen et al. | 725/92 |
| 2005/0091696 | A1 * | 4/2005 | Wolfe et al. | 725/116 |

(Continued)

OTHER PUBLICATIONS

"Format of individual frame types Section 8.3", Part 11: Wireless LAN Medium Access Control (MAC and Physical Layer (PHY Specifications, IEEE Draft P802.11-REVmb/D8.01, May 2011, pp. 409-442.

(Continued)

*Primary Examiner* — Jason Salce
(74) *Attorney, Agent, or Firm* — Guntin & Gust, PLC; Joseph Hrutka

(57) ABSTRACT

A system that incorporates teachings of the present disclosure may include, for example, a server having a controller to receive a request for media content from a set top box of an Internet Protocol Television System, perform a search of one or more storage devices associated with other set top boxes for the media content based at least in part on a user profile associated with the set top box where the other set top boxes are located remotely from the set top box, receive the media content, and adjust a format of the media content prior to delivery to the set top box based at least in part on the user profile. Other embodiments are disclosed.

23 Claims, 8 Drawing Sheets

(56) References Cited

U.S. PATENT DOCUMENTS

| | | | |
|---|---|---|---|
| 2005/0132208 A1* | 6/2005 | Hug et al. | 713/189 |
| 2005/0182825 A1* | 8/2005 | Eytchison | 709/217 |
| 2006/0218275 A1 | 9/2006 | Labio et al. | |
| 2007/0009235 A1 | 1/2007 | Walters et al. | |
| 2007/0039033 A1 | 2/2007 | Ota | |
| 2008/0145034 A1 | 6/2008 | Barton | |
| 2008/0235746 A1* | 9/2008 | Peters et al. | 725/111 |
| 2008/0271080 A1* | 10/2008 | Gossweiler et al. | 725/47 |
| 2008/0307462 A1* | 12/2008 | Beetcher et al. | 725/53 |
| 2009/0037954 A1* | 2/2009 | Nagano | 725/39 |
| 2009/0138441 A1* | 5/2009 | Valentine et al. | 707/3 |
| 2009/0182714 A1* | 7/2009 | Sezer et al. | 707/3 |
| 2010/0186038 A1* | 7/2010 | Thomas et al. | 725/42 |

OTHER PUBLICATIONS

"Secure Enablement and CVS without Persistent Association", S. Abraham, IEEE 802.11-11/0908r1, Jun. 2011, 10 pgs.

"Second Memorandum Opinion and Order, In the Matter of Unlicensed Operation in the TV Broadcast Bands, Additional Spectrum for Unlicensed Devices Below 900 MHz and in the 3 GHz Band", FCC, Sep. 23, 2010, 101 pgs.

"$3^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.2.0, Jun. 2011, 294 pgs.

"Part 11: Wireless LAN Medium Access Control (MAC) and Physical Layer (PHY) specifications, Amendment 3: TV White Spaces Operation", IEEE P802.11af/D1.02, Jun. 2011, 139 pgs.

* cited by examiner

100

200

500

600

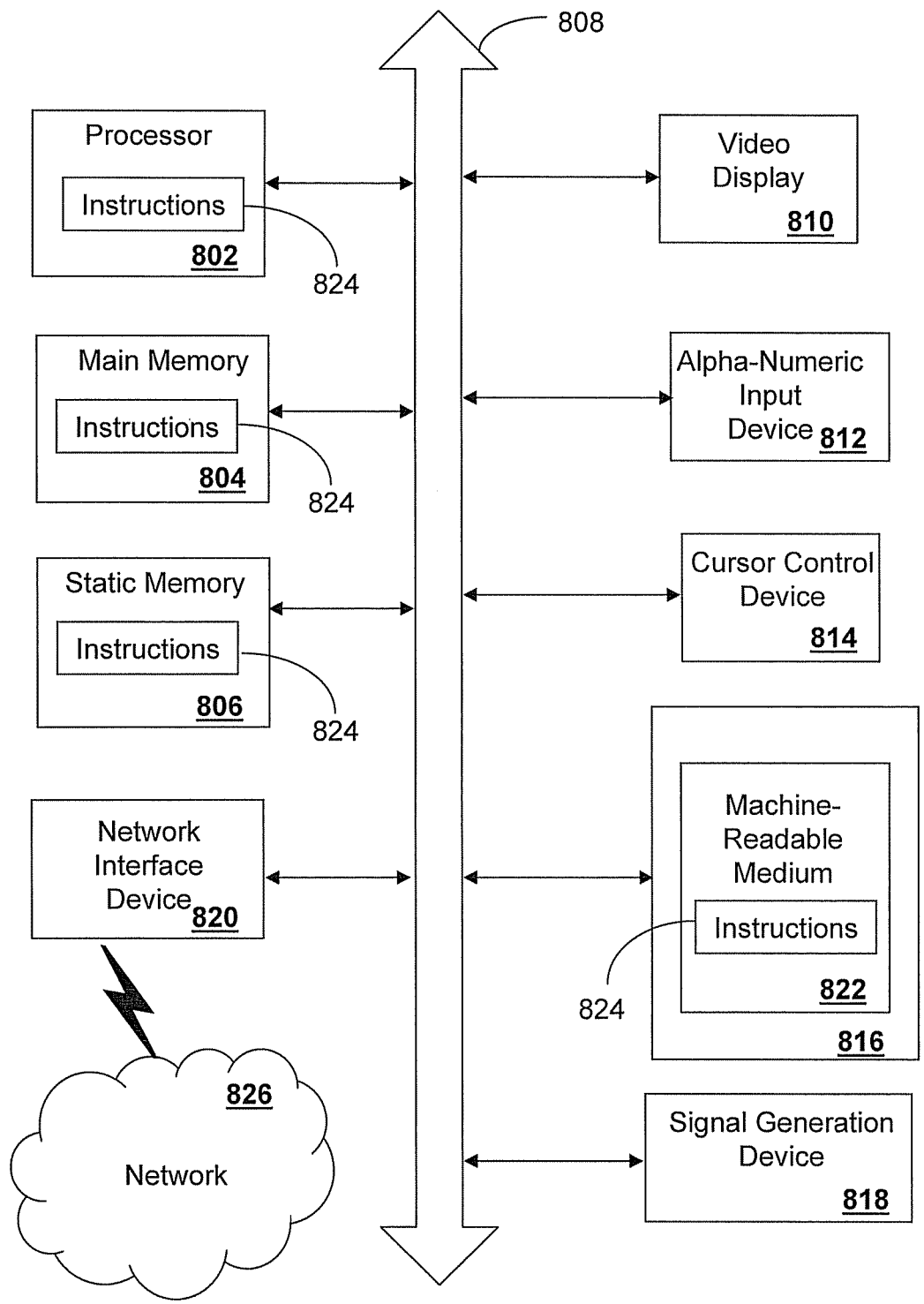
FIG. 8    800

APPARATUS AND METHOD FOR OBTAINING MEDIA CONTENT

FIELD OF THE DISCLOSURE

The present disclosure relates generally to network communications and more specifically to an apparatus and method for obtaining media content.

BACKGROUND

Media content can be stored at various locations, including digital video recorders in a customer premises and media libraries of a service provider. In U.S. Patent Publication No. 20070009235, a digital video recorder is described that accesses a network storage device over a network for particular portions of content not available on the digital video recorder and the network storage device provides those missing portions. The user may then rewind and playback not only already locally stored content but also that content provided by the storage device.

Similarly, a method and apparatus for downloading ancillary program data to a digital video recorder is described in U.S. Patent Publication No. 20080145034. Multimedia device users can select programs to record or download movies or music over a network, such as the Internet, from a content provider. The system automatically downloads and stores ancillary program data that is directly related to, and associated with, a program that has been selected for recording or content requested for download. When a user selects a program to view the user is offered the opportunity to browse ancillary program data associated with the program and view an ancillary program data.

BRIEF DESCRIPTION OF THE DRAWINGS

FIG. 8 is a diagrammatic representation of a machine in the form of a computer system within which a set of instructions, when executed, may cause the machine to perform any one or more of the methodologies discussed herein.

DETAILED DESCRIPTION

Figure 1:
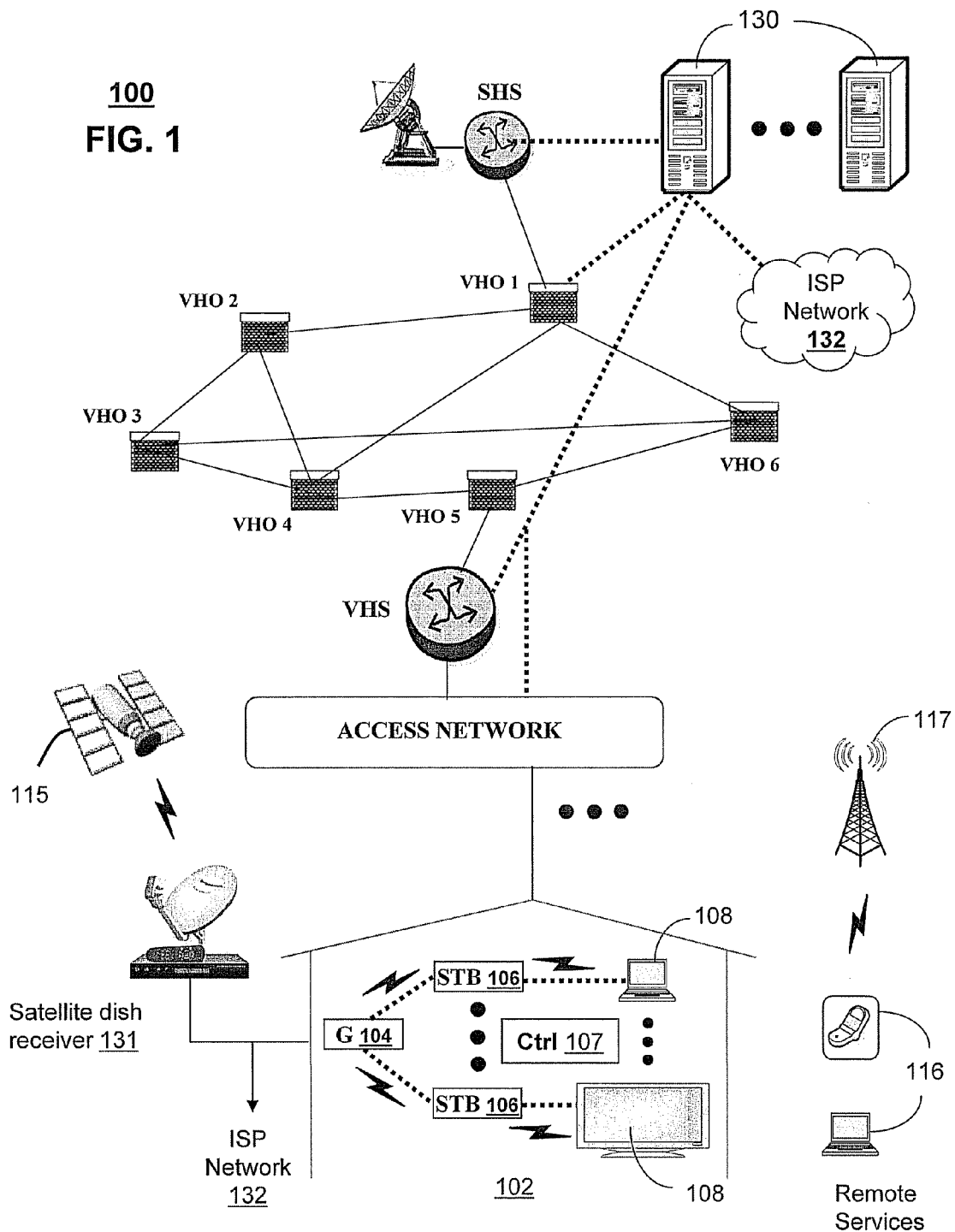
FIGS. 1-3 depict illustrative embodiments of communication systems that provide media services.

One embodiment of the present disclosure entails computer-readable storage medium, having computer instructions for receiving a request for media content from a set top box of a customer premises network, performing a first search of one or more storage devices associated with the customer premises network for the media content, performing a second search of one or more storage devices associated with other customer premises networks for the media content based at least in part on a user profile associated with the customer premises network, performing a third search of at least one of the Internet and an out-of-network database for the media content, receiving the media content located by one of the first, second or third searches, and performing at least one of transrating and transcoding on the media content prior to delivery to the set top box when the media content is retrieved from the Internet or the out-of-network database.

Another embodiment of the present disclosure entails a server having a controller to receive a request for media content from a set top box of a customer premises network, perform a first search of one or more storage devices associated with the customer premises network for the media content, perform a second search of one or more storage devices associated with other customer premises networks for the media content based at least in part on a user profile associated with the customer premises network where the second search is based on content availability data maintained by a monitoring device in communication with at least one of the customer premises network and the other customer premises networks, and receive the media content.

Yet another embodiment of the present disclosure entails a server having a controller to receive a request for media content from a set top box of an Internet Protocol Television System, perform a search of one or more storage devices associated with other set top boxes for the media content based at least in part on a user profile associated with the set top box where the other set top boxes are located remotely from the set top box, receive the media content, and adjust a format of the media content prior to delivery to the set top box based at least in part on the user profile.

Yet another embodiment of the present disclosure entails a set top box having a controller to store a user profile, obtain a request for media content, transmit the request to a server of an Internet Protocol Television System, the server performing first, second and third searches based on the request, the first search being of storage devices associated with the set top box, the second search being of storage devices associated with remote set top boxes, the third search being of at least one of the Internet and an out-of-network database, and receiving the media content located by one of the first, second or third searches, the media content being transrated by the server prior to delivery to the set top box.

Yet another embodiment of the present disclosure entails a method including receiving a request for media content from a set top box of a customer premises network, performing a first search of one or more storage devices associated with the customer premises network for the media content, performing a second search of one or more storage devices associated with other customer premises networks for the media content, receiving the media content, and performing at least one of transrating and transcoding on the media content prior to delivery to the set top box.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network, such as a local area network (LAN), to commercial and/or residential buildings 102 housing a gateway 104, such as a residential gateway or RG. The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107, such as an infrared or RF remote control. Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices or servers 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services, such as GSM, CDMA, UMTS, WiMAX, etc. In one embodiment, the server 130 can include processors or modules for preparing media content for distribution to a customer premises network, including a residence or commercial establishment. For example, the server 130 can perform transrating, transcoding and/or Digital Rights Management conversion. The present disclosure contemplates the server 130 being in communication with various sources of media content, including a database of such content, other customer premises networks, other private networks and/or the Internet.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
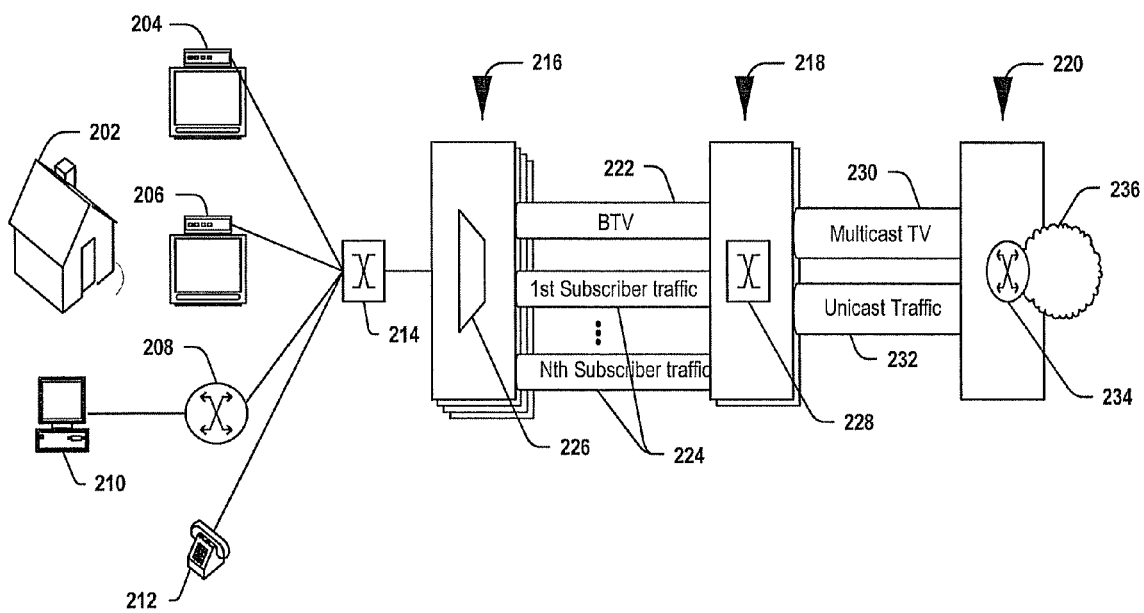

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
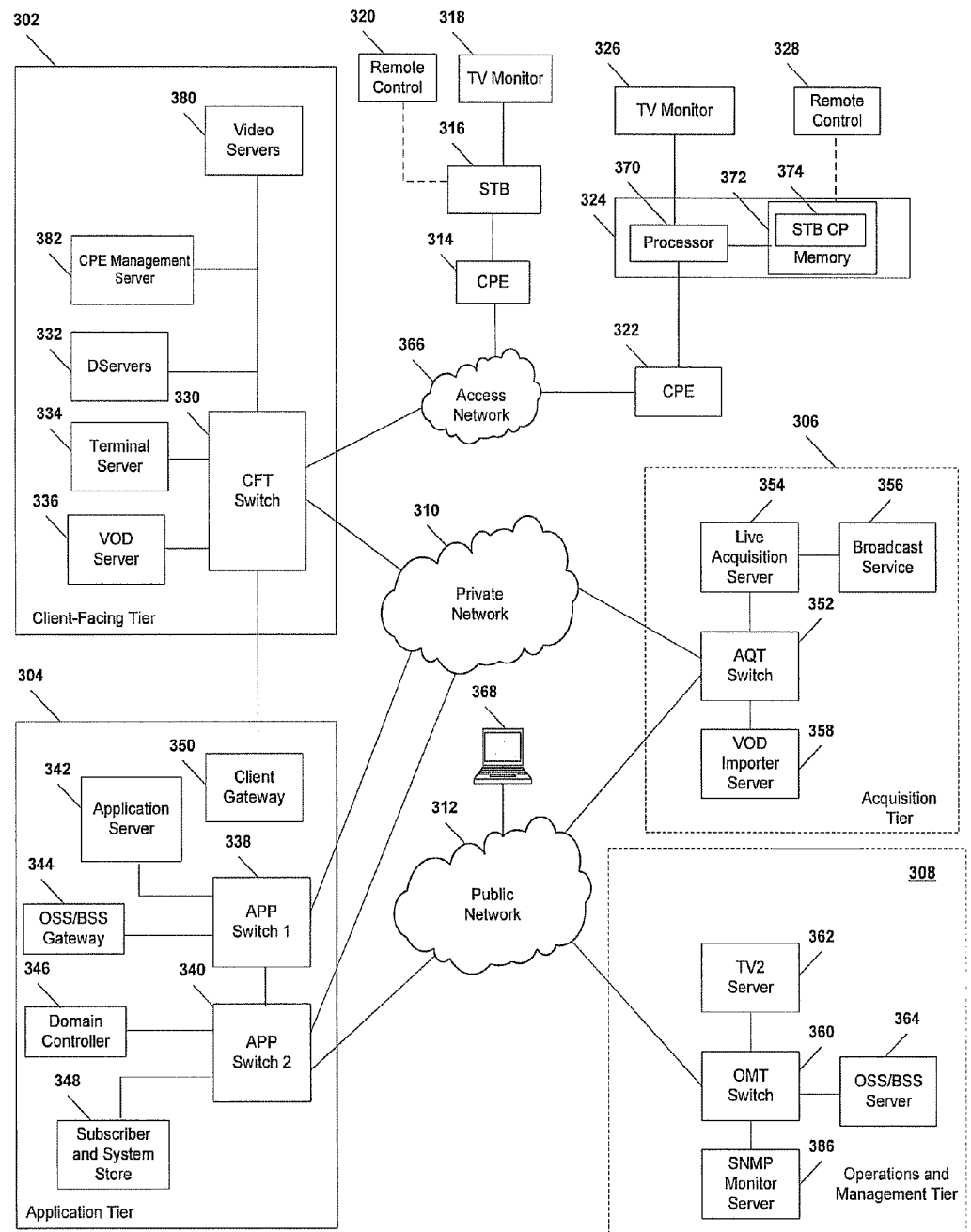

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, CPE 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, such as because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
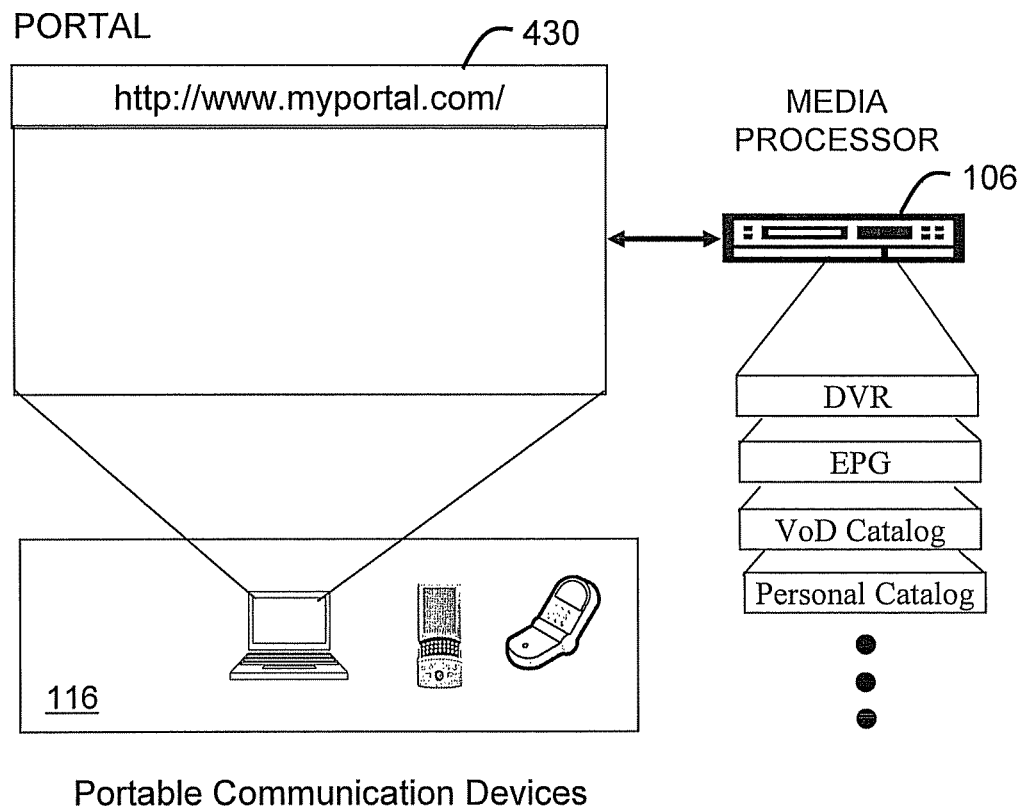
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-400. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB, such as personal videos, pictures, audio recordings, and so on.

Figure 5:
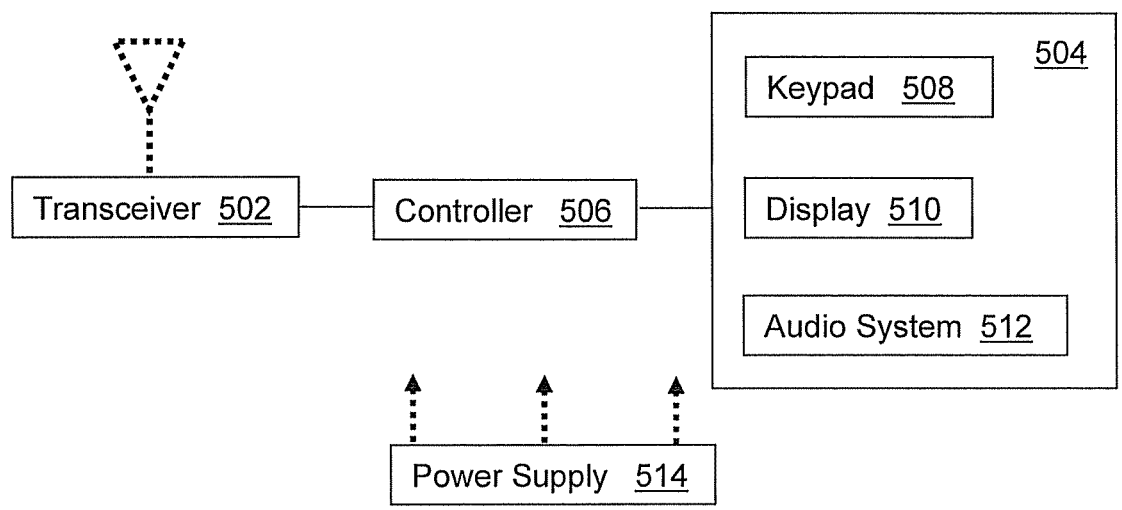
FIG. 5 depicts an illustrative embodiment of a communication device utilized in the communication systems of FIGS. 1-3.

FIG. 5 depicts an exemplary embodiment of a communication device 500. Communication device 500 can be a representative portion of any of the aforementioned communication devices of FIGS. 1-4. The communication device 504 can comprise a wireline and/or wireless transceiver 502 (herein transceiver 502), a user interface (UI) 504, a power supply 514, and a controller 506 for managing operations thereof. The transceiver 502 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 502 can also support common wireline access technologies such as circuit-switched wireline access technologies, packet-switched wireline access technologies, or combinations thereof. PSTN can represent one of the common circuit-switched wireline access technologies. VoIP and IP data communications can represent some of the commonly available packet-switched wireline access technologies. The transceiver 502 can also be adapted to support IP Multimedia Subsystem (IMS) protocol for interfacing to an IMS network that can combine PSTN and VoIP communication technologies.

The UI 504 can include a depressible or touch-sensitive keypad 508 and a navigation mechanism such as a roller ball, joystick, and/or navigation disk for manipulating operations of the communication device 500. The UI 504 can further include a display 510 such as monochrome or color LCD (Liquid Crystal Display), OLED (Organic Light Emitting Diode) or other suitable display technology for conveying images to the end user of the communication device 500. In an embodiment where the display 510 is touch-sensitive, a portion or all of the keypad 508 can be presented by way of the display. The UI 504 can also include an audio system 512 that utilizes common audio technology for conveying low volume audio, such as audio heard only in the proximity of a human ear, and high volume audio, such as speakerphone for hands free operation. The audio system 512 can further include a microphone for receiving audible signals of an end user.

The power supply 514 can utilize common power management technologies such as replaceable and rechargeable batteries, supply regulation technologies, and charging system technologies for supplying energy to the components of the communication device 500 to facilitate long-range or short-range portable applications. The controller 506 can utilize computing technologies such as a microprocessor and/or digital signal processor (DSP) with associated storage memory such a Flash, ROM, RAM, SRAM, DRAM or other storage technologies.

Figure 6:
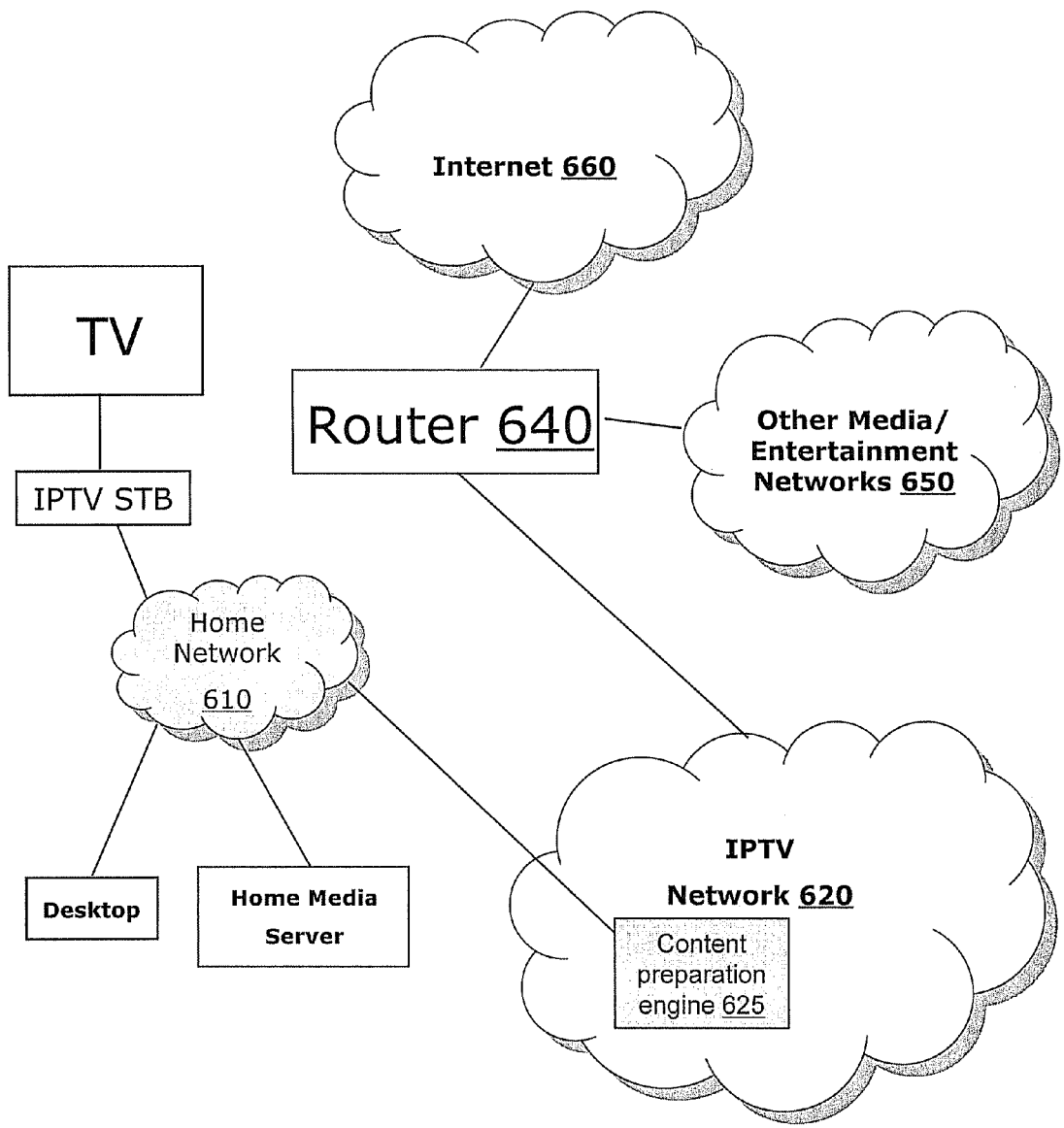
FIG. 6 depicts an illustrative embodiment of a communication system hat provides media service.

FIG. 6 depicts an illustrative embodiment of another communication system 600 for managing and delivering media content. Communication system 600 can be overlaid or operably coupled with communication systems 100-300 as another representative embodiment of said communication systems.

System 600 can include a customer premises network 610 having various components, including a desktop computer, a home media server, an IPTV STB, and so forth. The customer premises network 610 can be in communication with a content preparation engine 625 of an IPTV network 620. A router or other network access device 640 can provide communication with other networks 650 and the Internet 660. In one embodiment, the content preparation engine 625 can receive media content from the Internet 600 and/or the other networks 650, such as other Service Providers, and can distribute the media content to the customer premises network 610 after performing various functions on the media content, including transcoding, transrating and Digital Rights Management analysis and conversion.

Figure 7:
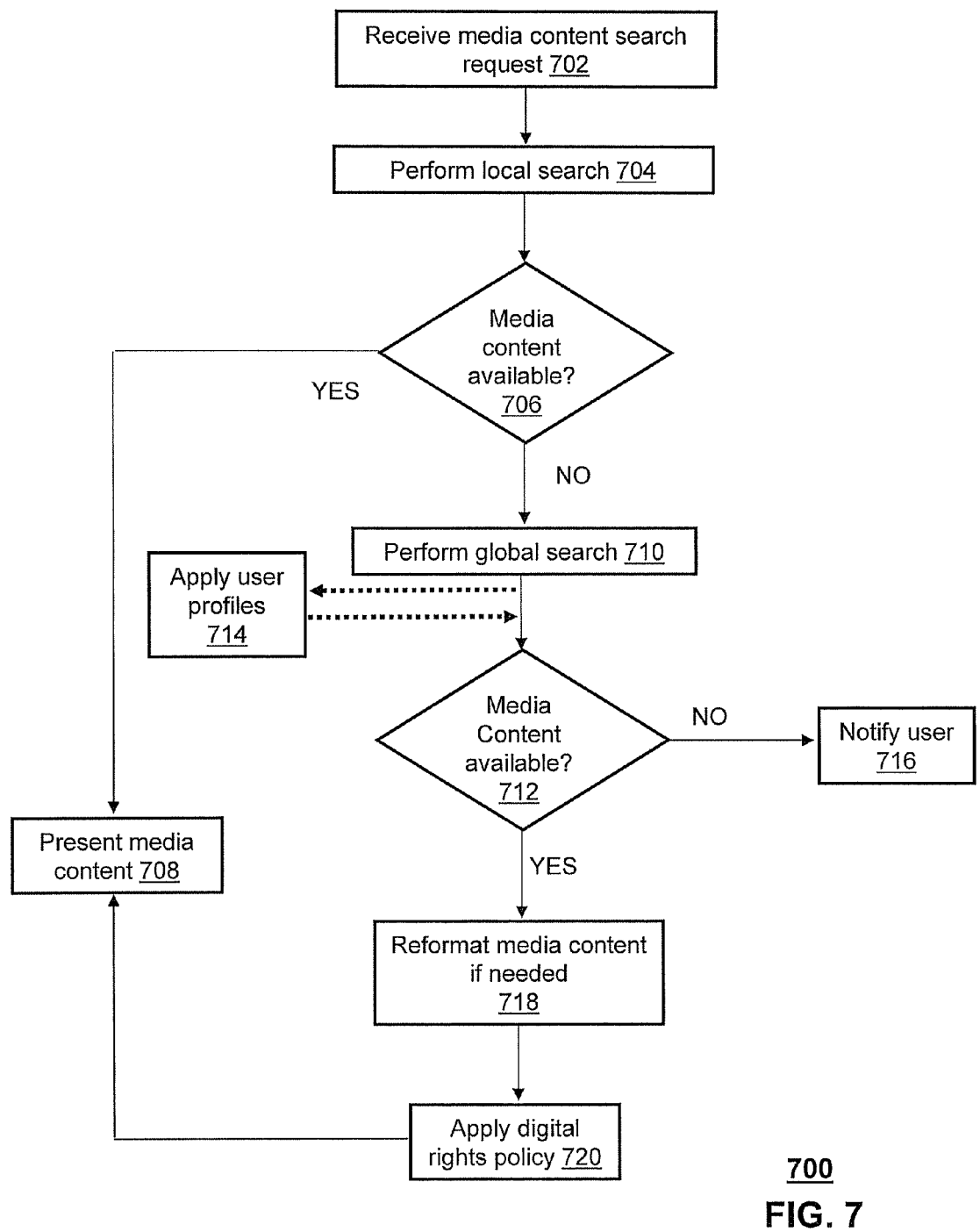
FIG. 7 depicts an illustrative embodiment of a method operating in portions of the communication systems of FIGS. 1-3 and 6.

FIG. 7 depicts an exemplary method 700 operating in portions of one or more of the communication systems 100-300 and 600. Method 700 has variants as depicted by the dashed lines. It would be apparent to an artisan with ordinary skill in the art that other embodiments not depicted in FIG. 7 are possible without departing from the scope of the claims described below.

Method 700 can begin with step 702 where the server 130 receives a search request for media content. In one embodiment, the request can be provided by a user of the STB 106, such as through entering text using the remote controller. Other Graphical User Interfaces (GUIs) are also contemplated by the present disclosure, including voice recognition. In another embodiment, the GUI can be incorporated into a dedicated channel of the STB for generating the request. In step 704, the server 130 can perform a local search for the media content. For instance, the local search can include storage devices of various components of the customer premises network, including multiple DVR's, desktop computer hardrives, and so forth. In another embodiment, the customer premises network can have an indexing or monitoring device for centrally identifying stored media content on various components of the customer premises network.

In step 706, the server 130 can determine the availability of the media content. If the media content is locally available then the media content can be presented or otherwise distributed to the STB 106 in step 708. If on the other hand the media content is not locally available, then in step 710 the server 130 can perform a global search can include various sources for media content. For instance, the sources can be customer premises networks associated with other users, including STB's, desktop computer storage devices and so forth of other users. In one embodiment, the server 130 can search indexing devices or other central storage components for the availability of the media content. The sources of the media content can include other Service Provider networks, including media libraries, customer premises networks and so forth, as well as the Internet. In another embodiment, server 130 or another monitoring device can obtain media content information from customer premises networks, such as through polling or receiving messages from the STBs each time media content is recorded and deleted.

In step 712, the server 130 can determine the availability of the media content from the global search. For instance, the availability can include whether the media content is free or must be paid for. In one embodiment in step 714, the server 130 can apply user profiles in determining the availability of the media content. For example, user profiles, such as a group profile, can identify users that allow for sharing of media content with each other. The sharing can be based on freely providing the media content or providing it as a trade for something in exchange, such as other media content. In one embodiment, fulfilling requests by providing media access can be monitored by the network and credits can be awarded, where the credits can be used for various purposes, including obtaining other media content or ancillary items or services, such as higher bandwidth, and so forth. If the media content is not available despite the local and global searches then the user can be notified of the unavailability as in step 716. If one the other hand the media content is available, then in step 718 the server can reformat the media content as necessary. For instance, the media content can be transrated to achieve the appropriate resolutions and bit rates. As another example, the media content can be transcoded to achieve the appropriate formats supported by the customer premises network.

In step 720, the server 130 can apply a Digital Rights Management policy to the media content, including conversion of the media content, such as when access to the content has been authorized through payment and the like. Various forms of Digital Rights Management can be applied, including Advanced Access Content System, Protected Media Path, and so forth. Method 700 can then return to step 708 for presenting or otherwise distributing the media content to the STB of the requester.

Upon reviewing the aforementioned embodiments, it would be evident to an artisan with ordinary skill in the art that said embodiments can be modified, reduced, or enhanced without departing from the scope and spirit of the claims described below. For example, user profiles can be utilized for determining the extent of transcoding, transrating or other format changes to be applied to the media content before being transmitted to the STB of the requestor. For instance, the user profile can designate a lower resolution media content to shorten any download time associated with the media content. Limits such as cost, resolution, download time, and so forth can be designated in the user profile to be applied to search results. The user profile can also be utilized to determine the source of the media content, such as where more than one copy of the media content is available. In one embodiment, the server 130 or another component of the network can perform load balancing analysis to determine the source to retrieve the media content from where there are multiple copies, such as based on network traffic data and so forth.

In one embodiment, the local and global searches can be performed simultaneously or in temporal proximity to each other. In another embodiment, the searches can be performed in stages, such as first performing the local search then performing a global search limited to other users in the network then performing a global search as to other Service Provider networks then performing an Internet search. The particular sequence of searching can be designated by the requestor, such as during generating the request or by way of the user profile. In one embodiment, the request can be made from other than the set top box, such as using a mobile phone, or can be made through the set top box using the mobile phone, such as entering the request into the mobile phone which is presented on the TV and transmitted by the set top box.

Other suitable modifications can be applied to the present disclosure without departing from the scope of the claims below. Accordingly, the reader is directed to the claims section for a fuller understanding of the breadth and scope of the present disclosure.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected, such as using a network, to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802, such as a central processing unit (CPU), a graphics processing unit (GPU, or both, a main memory 804 and a static memory 806, which communicate with each other via a bus 808. The computer system 800 may further include a video display unit 810, such as a liquid crystal display (LCD), a flat panel, a solid state display, or a cathode ray tube (CRT). The computer system 800 may include an input device 812, such as a keyboard, a cursor control device 814, such as a mouse, a disk drive unit 816, a signal generation device 818, such as a speaker or remote control, and a network interface device 820.

The disk drive unit 816 may include a computer-readable medium 822 on which is stored one or more sets of instructions, such as software 824, embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media, such as a centralized or distributed database, and/or associated caches and servers, that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission, such as TCP/IP, UDP/IP, HTML, HTTP represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising instructions, wherein responsive to executing the instructions, a processor performs operations comprising:
  receiving a request for media content from a set top box of a customer premises network;
  performing a first search responsive to the request and without user intervention, the first search being of a local storage device associated with the customer premises network for the media content;
  accessing a user profile associated with the customer premises network;
  performing a second search responsive to the first search failing to locate the media content and without user intervention, the second search being of remote storage devices associated with other customer premises networks for the media content based at least in part on the user profile, wherein the user profile identifies the remote storage devices of the other customer premises networks that allow content sharing with the set top box, wherein the content sharing is in exchange for access to local content stored by the set top box;

performing a third search responsive to the second search failing to locate the media content and without user intervention, the third search being of the Internet, an out-of-network database or a combination thereof for the media content;

responsive to receiving the request for the media content, performing load balancing analysis utilizing network traffic data;

receiving the media content located by one of the first, second, or third searches as received media content, wherein the received media content is a copy of the media content selected for transmission to the set top box from among a plurality of copies located at different sources based on the load balancing analysis; and performing transrating, transcoding or a combination thereof on the media content prior to delivery to the set top box when the media content is retrieved from the Internet or the out-of-network database.

2. The non-transitory, machine-readable storage medium of claim 1, comprising computer instructions which when executed by the processor cause the processor to perform operations comprising:

monitoring for the content sharing among the remote storage devices of the other customer premises networks and the set top box; and providing a service enhancement at the set top box in response to determining that the set top box has provided access to the local content for one of the other customer premises networks.

3. The non-transitory, machine-readable computer readable storage medium of claim 2, wherein the operations further comprise performing the transcoding on the media content based at least in part on the user profile, wherein the service enhancement comprises an increase in bandwidth.

4. The non-transitory, machine-readable storage medium of claim 1, wherein the user profile is a group profile identifying each of the customer premises network and the other customer premises networks as members.

5. The non-transitory, machine-readable storage medium of claim 1, wherein the first, second, and third searches are performed in temporal proximity to each other.

6. The non-transitory, machine-readable storage medium of claim 1, wherein the remote storage devices associated with the customer premises network comprise a desktop computer storage device and a digital video recorder.

7. The non-transitory, machine-readable storage medium of claim 1, wherein the second search is performed by communicating with a media monitoring device in communication with the other customer premises networks, and wherein the media monitoring device monitors available media content at the other customer premises networks.

8. A server, comprising:
a memory that stores instructions; and
a processor coupled to the memory, wherein responsive to executing the instructions, the processor performs operations comprising:
receiving a request for media content from a set top box of a customer premises network;
performing a first search of a local storage device associated with the customer premises network for the media content;
performing a second search of remote storage devices associated with other customer premises networks for the media content based at least in part on a user profile associated with the customer premises network responsive to the first search failing to locate the media content and without user intervention, wherein the second search is based on content availability data maintained by a monitoring device in communication with the customer premises network and the other customer premises networks, wherein the user profile identifies the remote storage devices of the other customer premises networks that allow content sharing with the set top box, wherein the content sharing is in exchange for access to local content stored by the set top box;

performing a third search responsive to the second search failing to locate the media content and without user intervention, the third search being of the Internet, an out-of-network database or a combination thereof for the media content; and receiving the media content located by one of the first, second, or third searches as received media content, wherein the received media content is a copy of the media content selected for transmission to the set top box from among a plurality of copies located at different sources based on load balancing utilizing network traffic data.

9. The server of claim 8, wherein the operations further comprise
adjusting a format of the media content prior to delivery to the set top box when the media content is retrieved from the Internet or the out-of-network database.

10. The server of claim 8, wherein the first, second, and third searches are commenced in temporal proximity to each other.

11. The server of claim 9, wherein the format of the media content is adjusted based at least in part on the user profile.

12. The server of claim 8, wherein operations further comprise selecting the media content from multiple copies of the media content at different sources based on network load balancing and the user profile.

13. The server of claim 8, wherein the operations further comprise performing a conversion of the media content prior to delivery to the set top box, according to a Digital Rights Management policy.

14. The server of claim 8, wherein the operations further comprise adjusting a format of the media content prior to delivery to the set top box.

15. A server comprising:
a memory that stores instructions; and
a processor coupled to the memory, wherein responsive to executing the instructions, the processor performs operations rising:
receiving a request for media content from a set top box of an interactive television system;
performing a first search of remote storage devices associated with other set top boxes for the media content based at least in part on a user profile associated with the set top box, wherein the other set top boxes are located remotely from the set top box, wherein the user profile identifies the remote storage devices of the other set top boxes that allow content sharing with the set top box, wherein the content sharing is in exchange for access to local content stored by the set top box;
performing a second search for the media content of the Internet responsive to the first search failing to locate the media content and without user intervention;

performing a third search for the media content of an out-of-network database responsive to the second search failing to locate the media content and without user intervention, selecting the media content from multiple copies of the media content located by one of the first, second, or third searches at different sources, wherein the media content is selected based on network load balancing;

receiving the media content as received media content, wherein the received media content is a copy of the media content selected for transmission to the set top box from among a plurality of copies located at different sources based on load balancing utilizing network traffic data; and adjusting a format of the media content prior to delivery to the set top box based at least in part on the user profile.

16. The server of claim 15, wherein the adjustment to the format comprises transrating, transcoding, or a combination thereof.

17. The server of claim 15, wherein the operations further comprise performing a conversion of the media content prior to delivery to the set top box according to a Digital Rights Management policy.

18. A set top box, comprising:
a memory that stores instructions; and
a processor coupled to the memory, wherein responsive to executing the instructions, the processor performs operations comprising:
storing a user profile;
obtaining a request for media content;
transmitting the request to a server of an interactive television system, the server performing first, second, and third searches based on the request, the first search being of a local storage device associated with the set top box, the second search being of remote storage devices associated with remote set top boxes responsive to the first search failing to locate the media content, the third search being of the Internet, an out-of-network database or a combination thereof responsive to the second search failing to locate the media content and without user intervention, wherein a user profile for the set top box identifies the remote storage devices of the remote set top boxes that allow content sharing with the set top box, wherein the content sharing is in exchange for access to local content stored by the set top box; and
receiving the media content selected from multiple copies of the media content located at different sources by the first search, the second search, the third search, or a combination thereof, wherein a source for the media content is selected from the multiple copies based on network load balancing utilizing network traffic data, wherein the media content is transrated by the server prior to delivery to the set top box.

19. The set top box of claim 18, wherein the media content is transcoded by the server prior to delivery to the set top box.

20. A method, comprising:
receiving a request for media content from a set top box of a customer premises network;
performing a first search responsive to the request and without user intervention, the first search being of a local storage device associated with the customer premises network for the media content;
performing a second search responsive to the first search failing to locate the media content and without user intervention, the second search being of remote storage devices associated with other customer premises networks for the media content, wherein a user profile for the set top box identifies the remote storage devices of the other customer premises networks that allow content sharing with the set top box, wherein the content sharing is in exchange for access to local content stored by the set top box;
performing a third search of the Internet, an out-of-network database or a combination thereof for the media content responsive to the second search failing to locate the media content and without user intervention; and
receiving the media content located by one of the first, second, or third searches as received media content, wherein the received media content is a copy of the media content selected for transmission to the set top box from among a plurality of copies located at different sources based on load balancing utilizing network traffic data; and
performing transrating, transcoding or a combination thereof on the media content prior to delivery to the set top box.

21. The method of claim 20, wherein the user profile is a group profile for the customer premises network and the other customer premises networks, and wherein a service enhancement is provided at the set top box in response to determining that the set top box has provided access to the local content for one of the other customer premises networks.

22. The method of claim 20, comprising performing a conversion of the media content prior to delivery to the set top box according to a Digital Rights Management policy.

23. The method of claim 20, comprising selecting the media content from multiple copies of the media content based on the user profile associated with the set top box.

* * * * *